United States Patent
Rindlav Westling et al.

(10) Patent No.: US 12,539,354 B2
(45) Date of Patent: Feb. 3, 2026

(54) MEDICAL DEVICE WITH SUBSTRATE COMPRISING NATURAL FIBRES

(71) Applicant: DENTSPLY IH AB, Mölndal (SE)

(72) Inventors: Åsa Rindlav Westling, Lindome (SE); Frida Iselau, Landvetter (SE); Heikki Sojakka, Markaryd (SE)

(73) Assignee: Dentsply IA AB, Molndal (SE)

( * ) Notice: Subject to any disclaimer, the term of this patent is extended or adjusted under 35 U.S.C. 154(b) by 489 days.

(21) Appl. No.: 17/680,833

(22) Filed: Feb. 25, 2022

(65) Prior Publication Data

US 2022/0265903 A1    Aug. 25, 2022

(30) Foreign Application Priority Data

Feb. 25, 2021  (EP) .................................... 21159364

(51) Int. Cl.
*A61L 29/04* (2006.01)
*A61L 29/08* (2006.01)

(52) U.S. Cl.
CPC ........... *A61L 29/043* (2013.01); *A61L 29/085* (2013.01)

(58) Field of Classification Search
CPC .... A61L 29/043; A61L 29/085; A61L 29/148; A61L 29/126; A61L 2400/10; A61L 29/14; A61L 2300/606; C08L 1/02; C08L 2201/06; A61M 2202/0496; A61M 2210/1089; A61M 25/0017; A61M 25/002; A61M 2210/1078; A61M 2025/0191; A61M 2025/0056; A61M 2210/1085; A61M 25/00; A61M 2025/0046; A61M 25/001; A61M 25/0015; A61M 25/0045; A61M 25/005; A61M 2025/0175; A47G 21/18; A47G 21/186; B31D 5/0095;
(Continued)

(56) References Cited

U.S. PATENT DOCUMENTS 2,084,673 A    6/1937  Dieffenbach
2,983,616 A    5/1961  Levi
(Continued)

FOREIGN PATENT DOCUMENTS

EP    0093093 A1    11/1983
EP    0217771 A1    4/1987
(Continued)

OTHER PUBLICATIONS

Namvar et al., Potential Use of Plant Fibers and their Composites for Biomedical Applications, 2014, BioResources, 9(3), pp. 5688-5706 (Year: 2014).*

(Continued)

*Primary Examiner* — Nicholas J. Weiss
*Assistant Examiner* — Brandon W. Levy
(74) *Attorney, Agent, or Firm* — SCHWEGMAN LUNDBERG & WOESSNER, P.A.

(57) ABSTRACT

A medical device for insertion into a natural or artificial body opening, such as a urinary catheter is described. The medical device comprises a substrate having a wall enclosing an internal cavity that forms a tubular body. The wall extends between a proximal insertion end and a distal rearward end. The wall comprises at least 30 wt % of natural fibers, such as cellulose fibers. One example medical device is, at least to a large extent, made of paper.

17 Claims, 4 Drawing Sheets

(58) Field of Classification Search
CPC ........ B29C 66/73791; B29K 2995/006; B29K 2001/00; B32B 1/08; B32B 2250/03; B32B 2250/26; B32B 2255/12
See application file for complete search history.

(56) References Cited

U.S. PATENT DOCUMENTS

| | | | |
|---|---|---|---|
| 8,168,249 B2 | 5/2012 | Utas et al. | |
| 10,130,202 B1* | 11/2018 | O'Neill | B31D 5/0095 |
| 2007/0016169 A1* | 1/2007 | Utas | A61L 29/14 |
| | | | 427/2.1 |
| 2015/0297863 A1* | 10/2015 | Hannon | A61M 25/0054 |
| | | | 427/2.3 |
| 2018/0021473 A1 | 1/2018 | Yliperttula et al. | |
| 2022/0033648 A1 | 2/2022 | Vaisanen et al. | |
| 2022/0396001 A1* | 12/2022 | Lian | B31D 5/0095 |

FOREIGN PATENT DOCUMENTS

| | | |
|---|---|---|
| EP | 3079752 A2 | 10/2016 |
| EP | 4049689 A1 | 8/2022 |
| JP | 2024507387 A | 2/2024 |
| KR | 20230150783 A | 10/2023 |
| WO | 9749437 A1 | 12/1997 |
| WO | 2004006626 A1 | 1/2004 |
| WO | 2020115363 A1 | 6/2020 |
| WO | 2020154578 A1 | 7/2020 |
| WO | 2020229215 A1 | 11/2020 |
| WO | WO-2022180201 A1 | 9/2022 |

OTHER PUBLICATIONS

Mishra et al., "A Review on Pineapple Leaf Fibers, Sisal Fibers and Their Biocomposites", 2004, Macromolecular Materials and Engineering, vol. 289, pp. 945, 1032 (Year: 2004).*

Extended European Search Report mailed Aug. 25, 2021 for European Patent Application No. 21159364.5.

Kargarzadeh, Hanieh, et al., "Recent developments on nanocellulose reinforced polymer nanocomposites: A review," Polymer 132, 368-393, 2017.

Namvar, Farideh, et al., "Potential Use of Plant Fibres and their Composites for Biomedical Applications," Cellulosics for biomed uses, BioResources 9(3), 5688-5706, 2014.

"European Application Serial No. 21159364.5, Communication Pursuant to Article 94(3) EPC mailed Apr. 18, 2024", 7 pgs.

"European Application Serial No. 21159364.5, Response filed Feb. 27, 2023 to Extended European Search Report mailed Aug. 25, 2021", 7 pgs.

"European Application Serial No. 21159364.5, Response filed Oct. 15, 2024 to Communication Pursuant to Article 94(3) EPC mailed Apr. 18, 2024", 11 pgs.

"International Application Serial No. PCT/EP2022/054762, International Preliminary Report on Patentability mailed Sep. 7, 2023", 9 pgs.

"International Application Serial No. PCT/EP2022/054762, International Search Report mailed May 24, 2022", 4 pgs.

"International Application Serial No. PCT/EP2022/054762, Written Opinion mailed May 24, 2022", 7 pgs.

* cited by examiner

MEDICAL DEVICE WITH SUBSTRATE COMPRISING NATURAL FIBRES

CROSS REFERENCE TO RELATED APPLICATION(S)

This patent document claims the benefits and priority of European Patent Application No. 21159364.5, filed on Feb. 25, 2021, which is incorporated herein by reference in its entirety.

TECHNICAL FIELD

The present invention relates to a medical device for insertion into a natural or artificial body opening, such as a urinary or rectal catheter.

BACKGROUND

Many medical devices incorporate elongate shafts, or similar types of substrates, such as tubes which are intended for insertion into and through passageways of a living body such as those of the urethral tract, the rectal tract and the cardiovascular system. The most common type of this general grouping of medical devices are known as catheters. Example catheters include those designated for urological use, i.e., urinary catheters, and for enterology use, such as rectal catheters. Because of the intended use of such medical devices, certain parameters need to be satisfied by the material from which the substrate/elongate shaft is manufactured. The material must fulfill such requirements as softness, stiffness, good kink resistance, good dimensional stability, processability, for example ease to form and glue, and the possibility to be sterilized by radiation, steam, ethylene oxide or other means. The material must also be able to withstand contact with liquids it is exposed to during use, such as urine. For some products, there is further the need for the material to accept a surface treatment which will impart desired surface properties to the medical device, such as hydrophilicity, surface roughness or smoothness, slipperiness, etc. To this latter end, the chemistry of the substrate material is critical since this affects the possibility to coat the substrate.

For many years now polyvinyl chloride (PVC) has been used to manufacture medical devices having elongate shafts for insertion into a body passageway, such as catheters, due to PVC fulfilling the requirements mentioned in the preceding paragraph. For instance, EP 0 093 093 by the present applicant makes known a process for manufacturing a PVC urinary catheter having a hydrophilic outer surface coating which exhibits a low coefficient of friction when wetted.

However, the suitability of PVC for medical devices such as catheters is now being questioned on environmental grounds and further because of the toxicity of the plasticizers added to PVC.

Other substrate materials have also been proposed. For example, WO 97/49437 by the present applicant proposes to use a polyether block amide and a styrene block copolymer as substrate material for a hydrophilic catheter, and U.S. Pat. No. 8,168,249, also by the present applicant, proposes the use of a polyolefin based substrate material. However, a problem with these materials is that these materials are relatively expensive to manufacture. Further, these materials are not from renewable resources or biodegradable.

Thus, there is a general problem for most previously known substrates for catheters and similar medical devices that they are costly and/or harmful to the environment, and/or that there are problems related to the hydrophilic coating, such as too poor water retention properties, especially after leaching, too poor adherence to the substrate and too high friction of the hydrophilic surface when wetted. Further, alternatively or additionally, the mechanical properties of the substrates may be inadequate, such as being too stiff or having too high resilience.

There is therefore a need for a new substrate material for medical devices, and in particular medical devices to be coated with a hydrophilic surface coating. Specifically, there is a need for medical devices, and substrate thereof, which are environmentally acceptable and cost effective, to which the hydrophilic coating can be adequately adhered, and which have adequate mechanical and chemical properties. In particular, there is a need for medical devices which are more sustainable, and which reduces the carbon footprint.

SUMMARY OF THE INVENTION

It is therefore an object of the present invention to provide a medical device, such as a catheter, for insertion into a natural or artificial body opening, which at least alleviates the above-discussed problems.

This object is obtained by means of a medical device in accordance with the disclosed embodiments.

According to a first aspect of the invention, there is provided a medical device for insertion into a natural or artificial body opening, said medical device comprising a substrate having a wall enclosing an internal cavity, the wall extending between a proximal insertion end and a distal rearward end, wherein said wall comprises at least 30 wt % of natural fibers.

Natural fibers are fibers produced naturally in the nature. The natural fibers are preferably at least one of vegetable, bacterial and animal natural fibers. Vegetable natural fibers are fibers produced by plants and the like, and are cellulose-based, or based on polysaccharides like starch and the like. Vegetable natural fibers include fibers such as cotton, flax, wood fibers, and jute. Animal natural fibers are fibers produced by animals, and are protein-based. Animal natural fibers include wool, mohair, and silk. Natural fibers may also be produced by bacterium, like bacterial polysaccharides or cellulose, such as the cyanobacterial polysaccharide sacran.

All of these natural fibers are particularly susceptible to microbial decomposition, and are biodegradable. Cellulosic fibers are decomposed by e.g., aerobic bacteria and fungi. Cellulose mildews and decomposes rapidly at high humidity and high temperatures, especially in the absence of light. Wool and silk are also subject to microbial decomposition e.g., by bacteria and moulds. Animal fibers are also subject to damage e.g., by moths and carpet beetles. This potential for decomposition makes the natural fibers very environmentally friendly.

Natural fibers may be mechanically, chemically or physically modified by i.e., chemical reactions, derivatization, grafting, absorption and/or adsorption. Depending on the type and degree of modification, the biodegradability of the natural fiber can be altered. Natural fibers may also be composed of smaller fibrous structures, like microfibrils.

Further, many natural fibers are readily available at a very low cost, making the production of the medical device very cost-effective.

Materials made of natural fibers are more sustainable than previously used materials, and reduces the carbon footprint, since such natural fiber based materials have a biological origin and renewable nature.

In a particularly preferred embodiment, the natural fibers comprise cellulose fibers. In particular, the substrate, or at least a first layer thereof, may be substantially a cellulose fiber blend, such as paper. In particular, the substrate/first layer may be formed by a suspension of pulped fibers, and in particular cellulosic fibers, and may in addition contain various amounts of non-fibrous ingredients, such as used in conventional paper-making processes. The paper could be made from wood pulp, flax, bagasse, wood veneer or woven cloth, straw, jute, rags, and the like.

The substrate/first layer may also be formed as a composite, or biocomposite, with natural fibers dispersed in a matrix. For example, the substrate/first layer may comprise a continuous thermoplastic polymer matrix, and natural fibers, e.g., in the form of particles, distributed in the matrix. The thermoplastic polymer may be a biodegradable or bio-based polymer, such as polylactide and polylactic acid. However, other biodegradable or non-biodegradable polymers may also be used. In particular, the composite materials may be of the type per se known from e.g., WO 2020/115363, also published as U.S. Patent Application Publication No. 2022/0033648, said document hereby incorporated in its entirety by reference.

It has surprisingly been found by the present inventors that a substrate based on, and also primarily formed by, natural fibers, such as cellulose based paper, can be used as a substrate for medical devices, such as for catheters. Not only has it been found that such substrate materials can be made with suitable and adequate rigidity and flexibility, and providing good kink resistance and dimensional stability. In addition, it has surprisingly been found that such substrate materials may have an adequate resistance to liquids, such as urine, for a sufficient period of time. It has also, even more surprisingly, been found that such substrate materials are well suited to be coated with a surface coating, such as a hydrophilic coating.

The substrate or the first layer comprises at least 30 wt % of natural fibers. However, preferably the first layer comprises at least 40 wt % of natural fibers, and preferably at least 50 wt %, and more preferably 70 wt %, and even more preferably at least 80 wt %, and most preferably at least 90 wt %. In one embodiment, the substrate is formed, at least partly, by paper.

In one embodiment, the substrate or the first layer comprises at least 30 wt %, and preferably at least 40 wt %, of natural cellulose fibers. Since, in such embodiments, the material of the substrate is preferably to a large, or very large, extent made of cellulose, the material may, in one embodiment, be arranged to disintegrate after a relatively short time when immersed in water. This makes it possible also to discard the medical device also in the toilet, to flush it down. In doing so, the medical device will after a while disintegrate similar to ordinary toilet paper. This may be referred to as a flushable medical device, such as a flushable catheter.

Regardless of whether the medical device is flushable or not, the material of the substrate/first layer is preferably chosen and arranged so that the medical device remains relatively intact and stable when exposed to liquids during use, and when exposed to fluids when activated for use. In particular, it is preferred that the substrate remains relatively intact when exposed to water or urine, such as, for a catheter, when water or urine flows through its internal lumen during a determined use time period, e.g., at least for a period of time sufficient to drain urine from the bladder, such as for at least 5 minutes, and preferably at least 10 or 15 minutes. Preferably, the material is also arranged to resist, at least to a large extent, transfer of moisture from an interior surface of the catheter to an exterior surface during this determined use time period. Further, when the substrate has been provided with a hydrophilic coating or the like, the substrate should preferably also be able to withstand the activation process, such as being able to resist a liquid or other fluid during a time sufficient for wetting and activation of the hydrophilic coating.

A relatively high resistance to urine and like, and a relatively low absorption, is also of advantage if the medical device, especially in the form of a urinary catheter, is e.g., discarded in a waste basket or the like, to reduce the odor.

At the same time, in case a flushable medical device is wanted, the material of the substrate/first layer is preferably hydro disintegrating, and chosen and arranged so that the medical device to a large extent disintegrates when immersed in water, such as within a period of time sufficient to make the medical device flushable. For example, the medical device could be arranged to be sufficiently disintegrated when immersed in water for a few hours or less. By hydro disintegrating is here meant a material which disintegrates when placed in an aqueous environment, such as when being immersed in water. Hereby, the fibers will be separated and the substrate/first layer will disintegrate.

The first layer preferably includes at least 30 wt % of natural cellulose fibers, such as at least 40 wt %, at least 50 wt %, at least 60 wt %, at least 70 wt %, at least 80 wt %, at least 90 wt %, or at least 95 wt %.

In one embodiment, the first layer is made primarily of natural cellulose fibers, such as paper.

The substrate may be formed by the first layer as a single layer. Hereby, the substrate may be formed essentially entirely by the first layer.

The substrate may also be formed by several identical layers, e.g., from rolling of sheets.

Alternatively, the substrate may comprise at least one additional layer, said additional layer forming a laminated construction with said first layer. The additional layer(s) may also be cellulose based layers, such as paper, but may have different composition and properties than the first layer, such as being more or less water resistant, more or less rigid, etc. However, an additional layer may also be made of a non-cellulose based material, such as a surface sizing agent, surface sizing starch or a thin coating of thermoplastic polymer or other polymeric materials.

In case additional layers are provided, the first layer is preferably the thickest layer.

In case one or more additional layer(s) is used, and in particular where the substrate is tubular, the first layer may be arranged as an innermost layer, facing the internal lumen of the tube, or as an outermost layer, forming the exterior surface of the tube. In case more than one additional layer is used, the first layer may also be an intermediate layer, arranged between the two or more additional layers.

In addition to the cellulose fibers, the cellulose based material, and in particular the first material, may comprise additives, such as one or more of fillers, pigments, wet strength chemicals, retention chemicals, cross-linkers, softeners or plasticizers, adhesion primers, wetting agents, biocides, optical dyes, hydrophobizing chemicals such as alkyl ketene dimer (AKD), alkyl succinic anhydride (ASA), waxes, resins etc.

The fillers may be any fillers known to be used in papermaking, such as mineral fillers like kaolin, china clay, titanium dioxide, gypsum, talc, chalk, ground marble, ground calcium carbonate and precipitated calcium carbonate.

Preferably, one or more sizing additives, such as e.g., rosin, liquid paraffin wax, alkyl ketene dimer (AKD), alkyl succinic anhydride (ASA), etc., may be added to the cellulose material to provide a desired water absorbency profile for the material.

In embodiments where AKD is used, the content of AKD is preferably in the range of 0.1-10 wt %, and preferably in the range 0.5-5%, and most preferably in the range 1-2 wt %.

The wet strength additives and/or retention chemicals may e.g., be polymers, such as polyacrylamide (PAM), or starch.

In embodiments where polylactic acid (PLA) is used, the content of PLA is preferably in the range of 0-50 wt %, and preferably in the range of 1-45 wt %, and more preferably in the range of 5-40 wt %, and even more preferably in the range of 10-35 wt %, and most preferably in the range of 20-30 wt %. Inclusion of PLA in the material makes the material more rigid. Other polymers, preferably bio-based, or from bio-based origin, may be used as well.

In one embodiment, a polymer forms the matrix wherein the fibers are distributed and embedded, forming a fiber composite that is partly or entirely a bio-based composite material.

It is also possible to impregnate or coat the substrate with wax or paraffin, and e.g., the substrate may be formed of wax paper or paraffin paper. Such wax or paraffin may e.g., be added as a coating on an internal and/or external side of a tubular substrate, or may impregnate the entire substrate or an entire layer thereof.

In a preferred embodiment, there is a high content of cellulose, and only additives to increase the hydrophobicity and optional fillers are added. However, in other embodiments, process additives may also be added.

The cellulose based material can be produced in a papermaking machine, such as any conventional type of machine known to the skilled person used for the production of paper, paperboard, or similar products. The material may be formed as a wet web, which is then dried. The dewatering may also include subjecting the web to heat, vacuum, ultrasound, pressure nips or the like. After dewatering and drying, the material may also be dried or smoothened by soft or hard nip, calenders etc.

Paper produced by conventional papermaking machines typically have the fibers generally oriented in the machine direction (MD). Such paper is generally stronger and more stable in the machine direction than in the cross direction (CD). When using such paper for the substrate, the MD may be arranged in a direction where the greatest stability is of need, such as in the circumferential direction when used as a catheter shaft. When multiple layers or sheets are used, it is also possible to arrange the sheets/layers so that the MD of the sheets occur in different directions, such as orthogonally to each other. In such an embodiment, one of the sheets/layers may have the MD in the axial direction, whereas the other sheet/layer has the CD in the axial direction. If more than two sheets/layers are used, the MD may occur also in additional directions, such as in 0, +/−45 and/or +/−90 degrees, compared to the axial, length direction.

The cellulose fibers of the material may be wood cellulose fibers, both from hardwood or softwood fibers. However, the cellulose may also be from other sources, such as agricultural fibers such as wheat straw pulp, bamboo, bagasse, or other non-wood fiber sources. The material is preferably made from pulp including pulp from virgin fiber, e.g., mechanical, chemical and/or thermomechanical pulps. It can also be made from broke or recycled paper, i.e., recycled fibers.

The material may also include nanocellulose, such as a cellulose nanofiber material containing multiple elementary fibrils with both crystalline and amorphous regions. In this case, the nanocellulose may be included together with other cellulose in a layer, or arranged in a separate layer. By using nanocellulose the material becomes more stable and rigid in shape, with an increased shape memory, and is also more water resistant than other cellulose materials, when made dense and smooth. The water resistance may also be increased by hydrophobicity treatment. The nanocellulose may be wood- or plant-based, and may be chosen from cellulose nanofibrils (CNF) or cellulose nanocrystals (CNC), preferably cellulose nanofibrils. This ensures that the raw materials for the cellulose product are obtained from an abundant, renewable and biodegradable source.

The material forming the substrate, regardless of whether it is a single layer material or a laminated material having two or more layers, preferably has a surface weight in the range of 15-180 g/m$^2$, and preferably 30-180 g/m$^2$, and more preferably 40-180 g/m$^2$, and more preferably 70-170 g/m$^2$, and most preferably 90-130 g/m$^2$. If the cellulose has thicker and longer fibers, a thinner material, may be provided, having essentially the same properties.

In an embodiment with two layers, the outer layer may have a lower surface weight than the inner layer. Such an outer layer may provide a smoother, more homogeneous outer surface. For example, the outer layer may have a surface weight of 15-60 g/m$^2$, and preferably 20-50 g/m$^2$, and most preferably 30-50 g/m$^2$. The inner layer may have a surface weight of 60-120 g/m$^2$, and preferably 60-100 g/m$^2$, and most preferably 60-90 g/m$^2$.

The water absorbance of the material is a measure of how much and how fast water is absorbed by the material. This may be measured as a Cobb value, and e.g., in accordance with the ISO 535:014 standard. In a test for measuring Cobb values, a water pillar is arranged over the material to be measured for a predetermined time. The water should be of room temperature, typically 23 degrees C. The weight of the material is measured before and after wetting, after having removed the water pillar and any remaining residual water, e.g., by a swift wiping with a wipe. The difference in weight constitutes the weight of the absorbed water. Different wetting times may be used, such as 60 seconds, 120 seconds, but longer and shorter periods may also be used. However, according to the standard procedure, the actual time during which the material is exposed to the water pillar is less than the indicated wetting time, to provide time to wipe of remaining water on the surface and the like. Thus, for a wetting time of 60 seconds, the exposure to the water pillar is 45 seconds, but the weighing is made after 60 seconds. In the present application, the Cobb values refer to measurements where the wetting has been made for 60 seconds—i.e., Cobb-60 values.

A low Cobb value means that only a small amount of water is absorbed, which is of advantage since it means that the material maintains its shape and rigidity even after some period of wetting, and that there is less odor from the material if stored (when wetted by e.g., urine). A higher Cobb value means that a greater amount of water is absorbed. This generally means that the material will disintegrate more easily during wetting. Thus, finding a material with an adequate Cobb value is an indication that the material may both remain stable and rigid enough during drainage through the tube, and also be easily disintegrated after use, e.g., when being flushed into the toilet.

In embodiments where a single cellulose based layer is used, i.e. only the first layer, it preferably has a low water absorbance, measured as a Cobb value, in the range of 5-50 $g/m^2$. Preferably, the Cobb value is in the range of 10-30 $g/m^2$, and most preferably in the range 10-20 $g/m^2$.

In embodiments where two or more cellulose based layers are used, the inner layer may have a lower Cobb value, and the outer layer may have a higher Cobb value, or a Cobb value similar to the one of the inner layer. In such embodiments, the inner layer may have a Cobb value in the range of 5-50 $g/m^2$, and preferably in the range 10-30 $g/m^2$, and most preferably in the range of 10-20 $g/m^2$. The Cobb value of the outer layer may be in the range of 50-150 $g/m^2$, and preferably in the range 70-130 $g/m^2$, and most preferably in the range of 80-110 $g/m^2$. The Cobb value of the outer layer may also be above 150 $g/m^2$, such 200 $g/m^2$ or more. However, alternatively, the outer layer may have a Cobb value similar to the one of the inner layer, such as in the range of 5-50 $g/m^2$, and preferably in the range 10-30 $g/m^2$, and most preferably in the range of 10-20 $g/m^2$.

In one embodiment, the Cobb value on the inside surface is preferably less than 30 $g/m^2$, and the Cobb value on the outside surface is preferably more than 100 $g/m^2$.

The material of the substrate, when formed as a tubular body, is preferably arranged to be more water resistant, and have greater water repellency, on the internal surface, i.e., facing the internal lumen, than in the middle of the wall, and/or on the external surface.

To this end, a chemical surface sizing agent, surface treatment agent or the like may be added to the internal surface, and optionally also to the external surface. For example, the surface can be made more dense and compact using a biobased composition, such as starch. The surface can also be made more hydrophobic by suitable additives. The surface texture and evenness can also be adjusted, e.g., by calendaring or surface sizing.

Additionally, or alternatively, when a laminated material is used, the inner layer may be a cellulose based layer having less absorbency, and greater water resistance, than another layer, such as an outer layer and/or an intermediate layer.

In another embodiment, when a laminated material is used, a thin layer of a hydrophobic organic material or the like, such as polylactic acid (PLA), may be arranged on the interior and/or exterior surface, as a coating. It is also possible to use other bio-based polymer layers or a silicone-based layer, starch-based layer, clay-based layer, polyethylene (PE) layer, or other thermoplastic polymer layers, and the like. Instead of being laminated, such a layer may also be provided in the form of spray or dip coating, or the like. A layer including nano-cellulose may also be used towards the interior or exterior surface.

In some cases, where water resistance is primarily achieved by additives on the surface, such as by surface sizing, additional measures may be taken to prevent edge wicking effects. Such additional measures may e.g., be to provide additives, such as alkyl ketene dimer (AKD).

Since at least the substrate of the medical device is made primarily of cellulosic material, the medical device is biodegradable and non-toxic, provided all added materials are as well. Together with cellulose being from a renewable resource, this makes the device very environmentally friendly. By a biodegradable material is here meant an organic material which breaks down by microorganisms, such as bacteria and fungi, in a microbial process, and preferably under environmental exposure, e.g., making the material compostable. A biodegradable material may also be biodegradable in accordance with any of the standards ASTM D6868 and EN 13432, and may also be compostable in accordance with the standard ASTM D6400.

The above-discussed medical device for insertion into an artificial or natural body opening may be of such type. However, preferably the medical device is intended for medical devices in the fields of urology or enterology. In an embodiment the medical device is a catheter. In embodiments the medical device is a urinary catheter or a rectal catheter. In other embodiments, the substrate may form a cone for partial insertion into e.g., the rectum.

When used as a catheter, the catheter may further comprise one or several drainage or discharge openings, so-called eyes or eyelets, arranged at or in the vicinity of a proximal insertion end, and internal lumen inside the catheter shaft, leading from the eyes to a discharge or introduction end. The eyes may be formed in the walls of the substrate. However, alternatively, an eye/opening may be formed centrally at the proximal insertion end of the tube. The position, size, shape and number of the eyelets may vary depending e.g., on the intended use of the catheter, the size of the catheter, etc. As another alternative, a separate tip may be formed and connected to the proximal insertion end of the tube, e.g., forming a closed proximal end and with eyes/openings provided to the sides. Such a separate tip may e.g., be formed by a plastic material, and may be connected to the tube by means of welding, adhesive or the like. The tip may also be formed from the fiber-based substrate in itself.

The substrate when used as a catheter, and also for other applications, preferably has a circular cross-sectional shape. However, other cross-sectional shapes are also feasible, such as oval, or as a polygon, preferably with rounded corners, such as a triangle, a rectangle, a hexagon, or the like.

Forming of drainage openings can be made by punching, cutting, or other per se well known methods.

Further, a distal part of the catheter may, at least on a part thereof, have larger cross-sectional dimensions than the catheter shaft. The distal part may e.g., be flared or funnel shaped, increasing in dimension towards the distal end, thereby making it easier to handle the catheter during use and prevent the catheter from being inserted too far. Such as a rearward end may be formed directly in the substrate. However, additionally or alternatively, a separate rearward element may be attached to the distal end of the substrate. Such a separate rearward part may e.g., be formed by a plastic, fibrous or fiber-composite material, and may be connected to the tube by means of welding, adhesive or the like. In embodiments, the rearward part may be made of the same or similar materials as used in the tube/substrate.

The catheter is preferably a urinary catheter for intermittent, short time use. The term "short term use" indicates a use that is limited in time, and in particular limited to a time period of less than 15 minutes, and preferably less than 10 minutes, and most preferably less than 5 minutes.

In one line of embodiments, the substrate forms a tubular body. The tubular body may comprise an inlet opening, an outlet opening and an internal lumen extending between said inlet opening and outlet opening. The tubular body preferably has a generally circular cross-section. However, other cross-sectional shapes are also feasible, such as an oval shape, or the shape of a polygon, such as a triangle, a rectangle or a hexagon, preferably with rounded corners.

Tubular substrates may also be used for other applications, such as for use as other types of catheters, as probes, as a tubular insertion aid, e.g., to aid manipulation and handling of catheters, etc.

The tubular body may be formed by winding of at least one strip in a helical shape, as is per se known from e.g., drinking straws. For example, the tubular body may be formed in the way disclosed in any one of WO 2004/6626, U.S. Pat. Nos. 2,084,673 and 2,983,616, said documents hereby being incorporated by reference. In a preferred embodiment, at least two strips are used in parallel, and most preferably three strips.

Alternatively, the tubular body may be formed by at least one sheet of material, either comprising a single layer or two or more layers. To form a tube, each sheet may be arranged so that two opposite sides are arranged overlapping each other or adjacent to each other. In particular if a single sheet is used, the opposite sides may be arranged in contact with each other, and preferably with an overlap, and connected to each other, preferably at the overlap, to provide a strong connection. Thus, the tubular body is here formed by a sheet arranged so that two opposite sides are connected along an axially extending connection line. The connection may be formed by an adhesive, such as a hot melt adhesive. The adhesive is preferably biocompatible. Alternatively, if the substrate is provided with a thin plastic layer, or a layer of polymer dispersion, the connection may also be provided by welding. In case several sheets are provided, the sheets may be arranged overlying each other, and with the meeting opposed sides of the sheets being displaced in the circumferential direction. In such an embodiment, the opposing sides may instead be connected via the underlying or overlaying sheet. Such formation of tubular bodies can e.g., be made in the way discussed in WO 2020/229215, said document hereby being incorporated in its entirety by reference.

However, other ways of forming the tubular body are also feasible, such as by extrusion, molding, wet forming, 3D printing and the like.

For certain applications, such as for use as a female urinary catheter, the substrate does not need to be very flexible. The female urethra is relatively short, typically about 4 cm, and relatively straight. Thus, a relatively rigid catheter substrate may be used. For other applications, such as for use as a male urinary catheter, the substrates need to have some flexibility, since the male urethra is relatively long, typically 18-20 centimeters, and with a curved path. For such applications, the substrate may be adapted to be more flexible. On the other hand, catheter used for enterology, i.e., bowel management, may be relatively rigid.

In one embodiment, a more flexible substrate may be provided by the use of an additional layer, connected to the first layer, and which may be of a more flexible material, such as a polymer.

Alternatively, or additionally, the flexibility may be increased by provision of a structural arrangement increasing flexibility. For example, the walls of the substrate may be provided with corrugations to make it easier to bend in various directions.

In one embodiment, the substrate may be provided a plurality of creases, arranged around the circumference of the tubular body. Such creases may be arranged as concentric circles around the circumference, but may also be arranged e.g., as a helix, or as multiple helices, e.g., arranged in parallel with each other. The creases are provided with an indentation or protrusion at the center, forming a convex or concave bead. Such creases are per se well-known for use in folding lines, but are here used to provide an increase flexibility to the substrate. The creases are preferably arranged distributed over the length of the substrate, and may be e.g., be arranged with a separation distance within the range of 2-20 mm, and preferably 2-15 mm, and more preferably 2-10 mm. The creases may be on the outside and/or the inside of the tubular substrate. In one embodiment, the substrate may be provided with a crinkly texture with a creasing process, such as creping.

Additionally, or alternatively, an insertable tip of the medical device, such as a urinary catheter, may also be provided with increased flexibility, and may e.g., be more flexible than the substrate/shaft. Such increased flexibility may be obtained in the same way as in the foregoing, e.g., by provision of creases.

The substrate may further be provided with a hydrophilic coating, the hydrophilic surface layer preferably providing a low-friction surface character to the medical device when wetted by a wetting fluid. The hydrophilic coating is preferably provided on an external side of the substrate. In one embodiment the hydrophilic coating comprises polyvinylpyrrolidone. Such a hydrophilic coating makes insertion of the medical device into the body opening easier and more comfortable, and reduces the risk of pain and hazard to the user.

In one embodiment, the hydrophilic coating may be one or more non-cued oil based hydrophilic polymer(s).

It has surprisingly been found that a hydrophilic coating bonds very well, and provides excellent properties, when attached to a substrate comprising natural fibers, and in particular natural cellulose fibers. In particular this seems to be the case with hydrophilic coatings comprising PVP.

In an embodiment of the invention hydrophilic coating may be formed in accordance with EP 0 093 093 and EP 0 217 771, said document hereby incorporated by reference. Alternatively, the coating may be formed by PVP, or any other suitable hydrophilic polymer, crosslinked by irradiation, such as with UV radiation or e-beam radiation.

These and other aspects of the invention will be apparent from and elucidated with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

Figure 1:
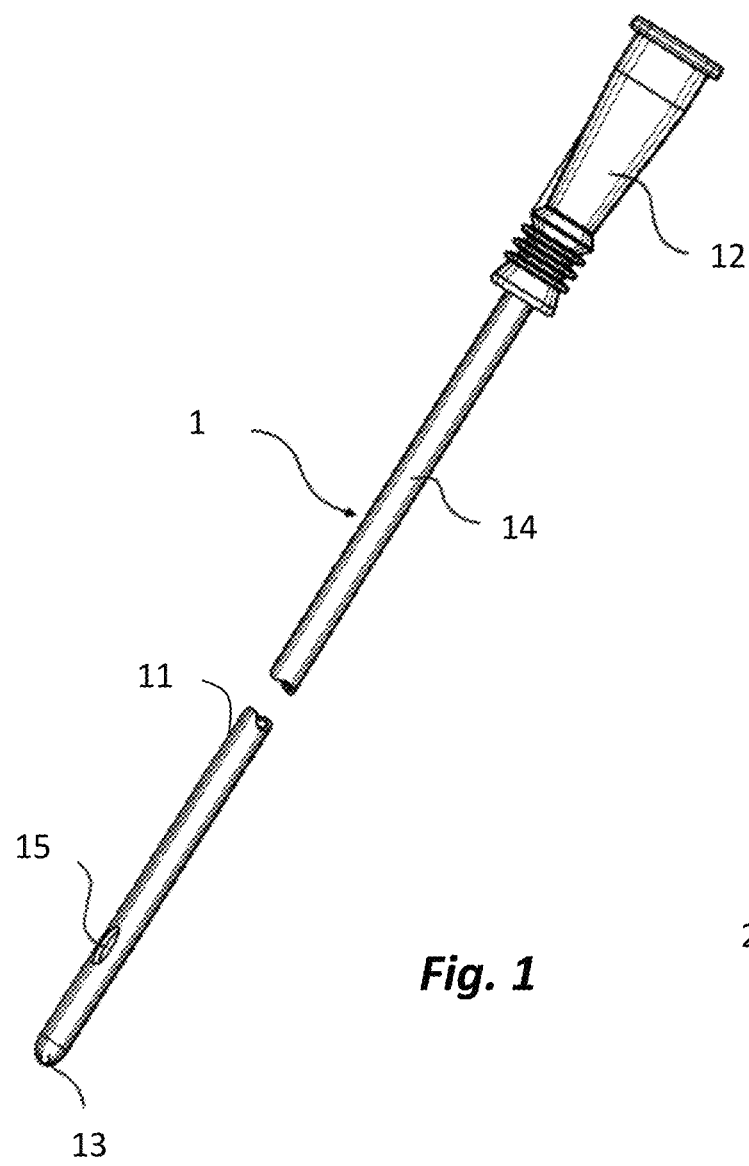
FIG. 1 is an illustration of an example urinary catheter in accordance with an embodiment of the present invention.

In the following detailed description aspects of the various embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the embodiments of the invention, e.g., the length, width and height of the medical device, etc.

An example urinary catheter, illustrated schematically in FIG. 1, comprises a catheter 1 having an insertable section 11, comprising an insertable, proximal part, with an insertion tip 13, and a catheter shaft 14, and a non-insertable section 12, a distal part, forming a funnel or connector part and the discharge end. The non-insertable section 12 preferably has a larger diameter than the insertable section 11 at least on a part thereof. The rear end of the non-insertable section may be flared or funnel-shaped, and may be arranged to be connected to a tapered connection part of a urine collection bag or the like. However, the non-insertable section may alternatively have a relatively uniform cross-sectional area.

Drainage openings 15, so called eyes or eyelets are provided at or in the vicinity of the insertion tip 13, and are connected to a discharge opening in the non-insertable section 12 through an internal lumen formed within the catheter shaft. In this embodiment, the catheter comprises a single lumen, but two or more lumens are also feasible.

The catheter shaft forms a substrate, forming a wall enclosing an internal cavity in the form of the lumen. The catheter shaft and the wall extend between a proximal insertion end, the insertion tip 13, and a distal rearward end. At least a first layer of the substrate and the wall is made of a material comprising natural fibers, and preferably vegetable, bacterial or animal natural fibers. This material is discussed in more detail in the following.

The insertion tip may be formed by the same material as the substrate, and may e.g., be formed as an integral, monolithic part of the catheter shaft. However, alternatively, the insertion tip may be formed as a separate part, e.g., formed by a plastic material, and connected to the shaft by means of adhesive, welding or the like. In such embodiments, the insertion tip preferably forms a closed rounded proximal end, and with the drainage openings being provided on the side of the insertion tip, or in the wall of the catheter shaft. When formed as a separate part, this part may also be formed by a material based on natural fibers, such as the same or similar material as used in the shaft, or by another material based on natural fibers, but having properties and characteristics different than the material of the shaft, such as being more flexible. However, in other embodiments, a central open end of the catheter shaft may serve as the drainage opening by itself, or in combination with other drainage openings. In such embodiments, no insertion tip is needed. In the illustrative example, the drainage openings are provided in the wall of the substrate/catheter shaft.

The rearward part may also be formed by the same material as the substrate, and may e.g., be formed as an integral, monolithic part of the catheter shaft. However, alternatively, the rearward part may be formed as a separate part, e.g., formed by a plastic material, and connected to the shaft by means of adhesive, welding or the like. When formed as a separate part, this part may also be formed by a material based on natural fibers, such as the same or similar material as used in the shaft, or by another material based on natural fibers, but having properties and characteristics different than the material of the shaft, such as being more rigid. The rearward part should preferably have a greater cross-sectional area than the catheter shaft, and may e.g., be formed as a funnel. However, in other embodiments, the rearward part may have the same diameter as the catheter shaft, and may be formed simply as an extension of the catheter shaft.

In case the catheter is intended for female users, the catheter shaft/substrate may have a length in the range of 4-12 cm, and preferably 5-10 cm. In case the catheter is intended for male users, the catheter shaft/substrate may have a length in the range of 20-40 cm, and preferably 30-40 cm.

For use as a female urinary catheter, the substrate does not need to be very flexible. The female urethra is relatively short, typically about 4 cm, and relatively straight. Thus, a relatively rigid catheter substrate may be used. For other applications, such as for use as a male urinary catheter, the substrates need to have some flexibility, since the male urethra is relatively long, typically 18-20 centimeters, and with a curved path. For such applications, the substrate may be adapted to be more flexible.

In one embodiment, a more flexible substrate may be provided by the use of an additional layer, connected to the first layer, and which may be of a more flexible material, such as a polymer. Such arrangements are discussed further in the following.

Alternatively, or additionally, the flexibility may be increased by provision of a structural arrangement increasing flexibility. For example, the walls of the substrate may be provided with corrugations to make it easier to bend in various directions.

In one embodiment, the substrate may be provided with a plurality of creases, arranged around the circumference of the tubular body. The creases are provided with an indentation or protrusion at the center, forming a convex or concave bead. Such creases are per se well-known for use in folding lines, but are here used to provide an increase flexibility to the substrate. The creases are preferably arranged distributed over the length of the substrate, and may be e.g., be arranged with a separation distance within the range of 2-20 mm, and preferably 2-15 mm, and more preferably 2-10 mm. Alternatively, the creases may be arranged only in certain parts of the catheter. In one embodiment, the substrate may be provided with a crinkly texture with a creasing process, such as creping. Creases or the like may also be used to make the substrate compactable in one direction. For example when used as a male catheter, this could be used to allow the catheter to be arranged in a shorter state in a storage position, and enable it to be expanded into a greater length when it is intended to be used.

The catheter, including the substrate, may further be provided with a hydrophilic coating, the hydrophilic surface layer preferably providing a low-friction surface character to the medical device when wetted by a wetting fluid. The hydrophilic coating is preferably provided on an external side of the substrate. In one embodiment the hydrophilic coating comprises polyvinylpyrrolidone. Such a hydrophilic coating makes insertion of the medical device into the body opening easier and more comfortable, and reduces the risk of pain and hazard to the user.

Preferably, at least the insertable section 11 is coated with the hydrophilic coating. Typically, the insertable length is within 50-140 mm for a female patient and 200-350 mm for a male patient. Even though PVP is the preferred hydrophilic material, other hydrophilic materials may be used, such as hydrophilic polymers selected from polyvinyl compounds, polysaccharides, polyurethanes, polyacrylates or copolymers of vinyl compounds and acrylates or anhydrides, especially polyethyleneoxide, heparin, dextran, xanthan gum, polyvinyl alcohol, hydroxy propyl cellulose, methyl cellulose, copolymer of vinylpyrrolidone and hydroxy ethylmethyl acrylate or copolymer of polymethylvinyl ether and maleinic acid anyhydride. However, instead of a hydrophilic surface coating, the entire insertable section of the catheter may be formed of a hydrophilic material combined with a layer comprising natural fibers.

However, alternatively the catheter may not be provided with any hydrophilic coating, and may e.g., be lubricated with gel prior to insertion.

Figure 2:
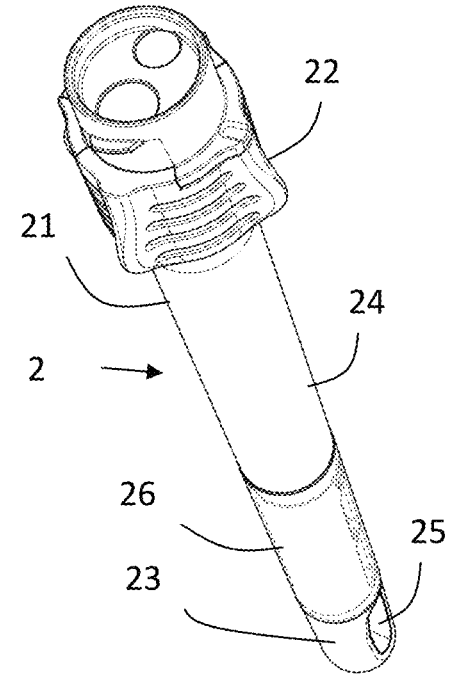
FIG. 2 is an illustration of an example rectal catheter in accordance with an embodiment of the present invention.

In another line of embodiments, the medical device is a rectal catheter, as schematically illustrated in FIG. 2. The rectal catheter comprises an insertable section 21, comprising an insertable, proximal part, with an insertion tip 23, and a catheter shaft 24, and a non-insertable section 22, a distal part, forming a funnel or connector part and the discharge end. The non-insertable section 22 preferably has a larger diameter than the insertable section 21 at least on a part thereof. The rear end of the non-insertable section may have an interface to be connected to a liquid reservoir, a pump, or the like.

Outlet openings 25 are provided at or in the vicinity of the insertion tip 23, and are connected to an inlet opening in the non-insertable section 22 through an internal lumen formed within the catheter shaft. In this embodiment, the catheter comprises one lumen to transfer irrigation liquid from a reservoir to the outlet opening(s). An additional lumen may be provided for inflation and deflation of an expandable retention element 26, such as a balloon. Thus, in this example, the catheter shaft comprises two lumens. However, other types of retention elements, not requiring any supply of air or liquid are also feasible, and it is also possible to use rectal catheters without any retention elements. In such embodiments, the catheter may have a single lumen.

The catheter shaft forms a substrate, forming a wall enclosing an internal cavity in the form of the lumen. The catheter shaft and the wall extend between a proximal insertion end, the insertion tip 23, and a distal rearward end. At least a first layer of the substrate and the wall is made of a material comprising natural fibers. This material is discussed in more detail in the following.

The insertion tip may be formed by the same material as the substrate, and may e.g., be formed as an integral, monolithic part of the catheter shaft. However, alternatively, the insertion tip may be formed as a separate part, e.g., formed by a plastic material or by a material comprising natural fibers, and connected to the shaft by means of adhesive, welding or the like. In such embodiments, the insertion tip preferably forms a closed rounded proximal end, and with the drainage openings being provided on the side of the insertion tip, or in the wall of the catheter shaft. However, in other embodiments, a central open end of the catheter shaft may serve as the drainage opening. In such embodiments, no insertion tip is needed. In the illustrative example, the outlet openings are provided in the tip, which also forms a closed forward end.

The rearward part may also be formed by the same material as the substrate, and may e.g., be formed as an integral, monolithic part of the catheter shaft. However, alternatively, the rearward part may be formed as a separate part, e.g., formed by a plastic material or a material comprising natural fibers, and connected to the shaft by means of adhesive, welding, friction fit connection, or the like. The rearward part may have a greater cross-sectional area than the catheter shaft, and may e.g., be formed as a funnel. However, in other embodiments, the rearward part may have the same diameter as the catheter shaft, and may be formed simply as an extension of the catheter shaft.

The rectal catheter may have a length in the range of 4-15 cm, and preferably 5-10 cm.

The rectal catheter may also be provided with a hydrophilic coating, in the same way as for the above-discussed urinary catheter.

The rectal catheter discussed above may e.g., be used for transanal irrigation, wherein a relatively long part of the catheter shaft may be inserted into the rectum of the user for introduction of irrigation liquid. However, a rectal catheter may also be used for enema.

A rectal catheter/probe may be provided with an abutment or stop member to prohibit to deep insertion of the catheter/probe into the rectum, and also to provide some protection for the hand holding the catheter. Such a rectal catheter arrangement is illustrated in FIG. 3.

Figure 3:
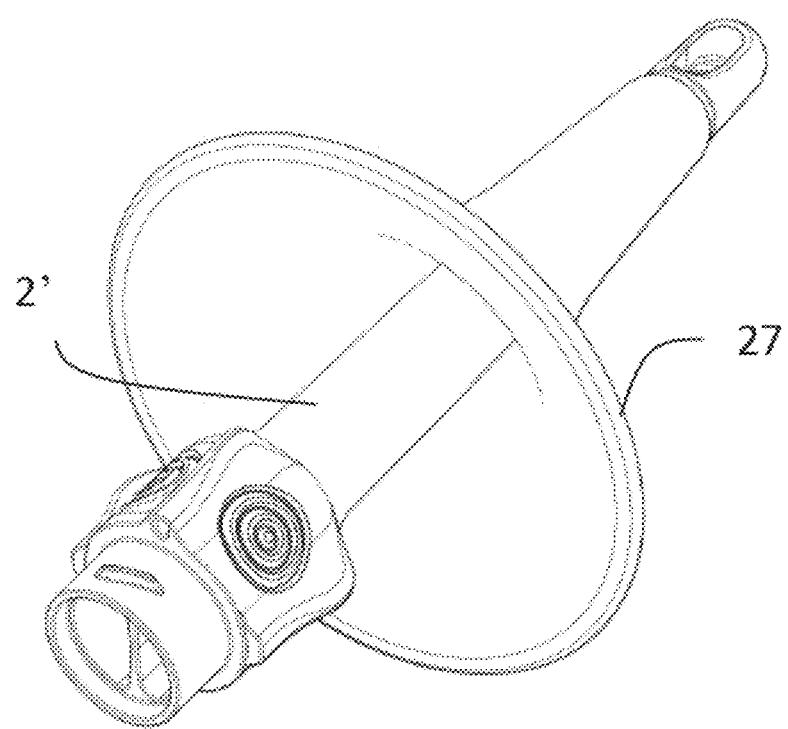
FIG. 3 is an illustration of another example rectal catheter assembly in accordance with an embodiment of the present invention.

In the rectal catheter arrangement of FIG. 3, the same catheter 2 as discussed in relation to FIG. 2 may be used. However, in this case, the catheter need not have any retention element. Further, an abutment 27, e.g., in the form of a cone, is provided and attached with its smallest end in the vicinity of the insertion tip 23, and therefrom gradually extending in width towards the rearward end. The width may extend uniformly, to form a conical shaped abutment. However, preferably, as in the illustrative example, the abutment tapers more significantly towards the base, i.e., at the distal side, and less pronouncedly towards the tip/apex, i.e., at the proximal side. Hereby, a horn shape is obtained, as shown in FIG. 3.

In this rectal catheter arrangement, the abutment 27 may, in addition, or as an alternative, to the catheter shaft, form a substrate, forming a wall enclosing an internal cavity (the interior of the cone or horn). The abutment and the wall extend between a proximal insertion end, i.e., the apex, and a distal rearward end, i.e., the base. At least a first layer of the substrate and the wall is made of a material comprising natural fibers. This material is discussed in more detail in the following.

In embodiments where the substrate of the medical device forms a tubular body, as in the above-discussed urinary and rectal catheters, the tubular body may be produced in various ways.

Figure 4:
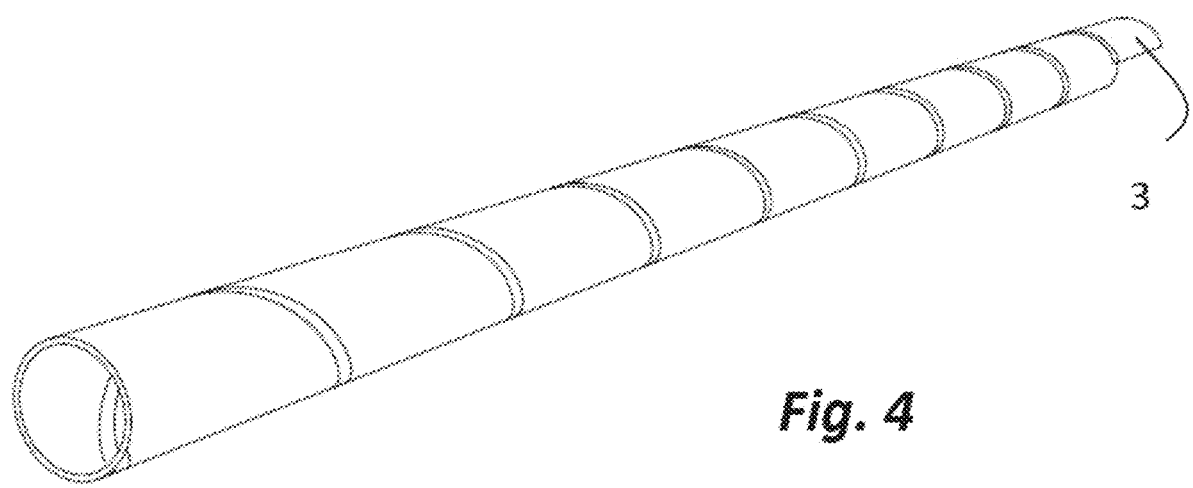
FIG. 4 is a schematic perspective view of a tubular body in accordance with an embodiment of the present invention.

The tubular body may be formed by winding of at least one strip 3 in a helical shape, as schematically illustrated in FIG. 4. Such forming of a tubular body is per se known from e.g., drinking straws. For example, the tubular body may be formed in the way disclosed in any one of WO 2004/6626, U.S. Pat. Nos. 2,084,673 and 2,983,616, said documents hereby being incorporated by reference. In a preferred embodiment, at least two strips are used in parallel, and most preferably three strips.

Figure 5A:
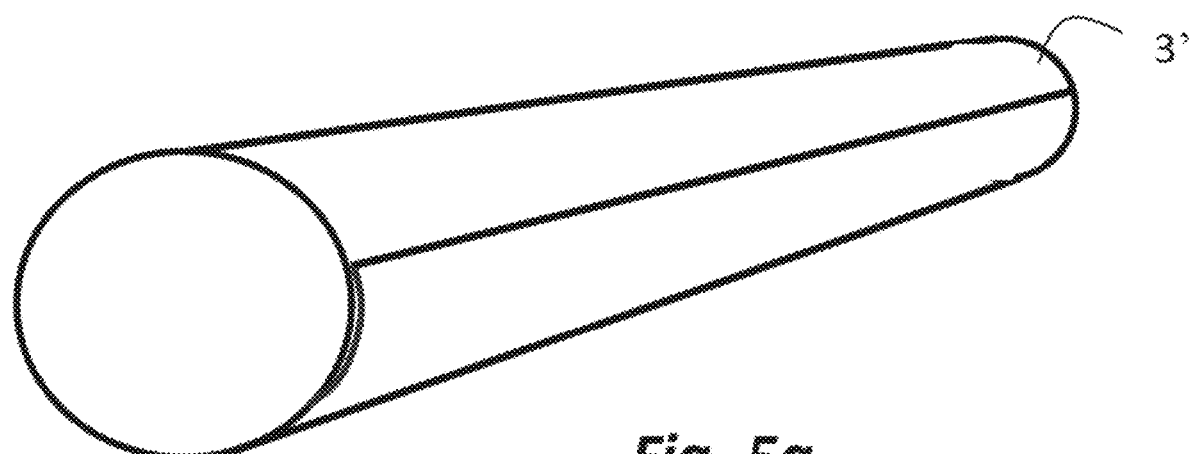
FIGS. 5a and 5b are a schematic perspective view and a schematic side view, respectively, of a tubular body in accordance with two other embodiments of the present invention.

Alternatively, the tubular body may be formed by a single sheet 3' of material, either comprising a single layer or two or more layers. To form a tube, two sides of the sheet may be connected to each other, preferably with an overlap to provide a strong connection, as illustrated in FIG. 5a. Thus, the tubular body is here formed by a sheet arranged so that two opposite sides are connected along an axially extending connection line. The connection may be formed by an adhesive, such as a hot melt adhesive. The adhesive is preferably biocompatible.

Figure 5B:
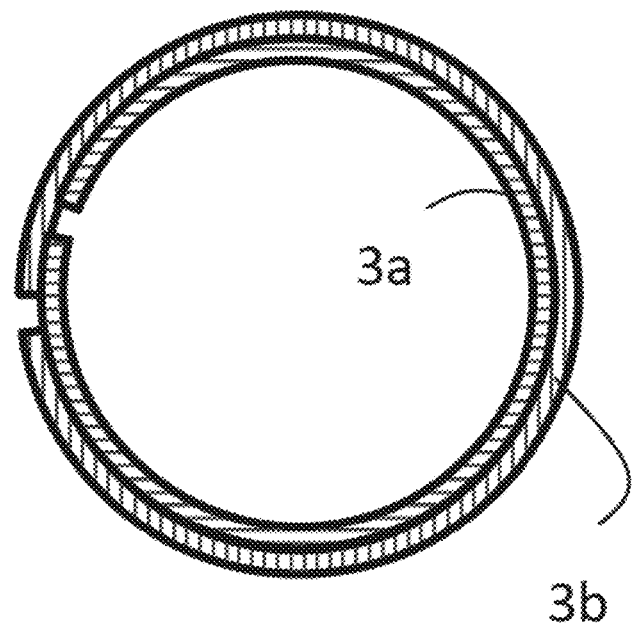

Alternatively, as shown in FIG. 5b, the tubular body may be formed by two or more sheets 3a and 3b, where each sheet is arranged so that two sides of the sheet are arranged in contact with each other, or arranged in close vicinity to each other, and where the sheets are displaced in relation to each other in a circumferential direction, so that the meeting sides for the sheets occur displaced from each other. At least the parts of the sheets adjacent the meeting sides may then be connected to an overlaying or underlaying sheet, e.g., by an adhesive being arranged on one or both the sheets. Such tubular bodies may e.g., be produced by manufacturing equipment such as Hauni Straw Maker (HSM), commercially available from Hauni Maschinenbau GmbH, in Hamburg, Germany. Tubular bodies formed in this way may obtain very uniform thickness over the entirety of the tubular bodies.

However, other ways of forming the tubular body are also feasible, such as by extrusion, molding, wet forming, 3D printing, and the like.

The substrate of the medical device comprises natural fibers. In one embodiment, the natural fibers are used in the entire substrate. In other embodiments, the natural fibers are used in one layer, the first layer, and with one or more additional layers being connected to the first layer.

Figure 6A:
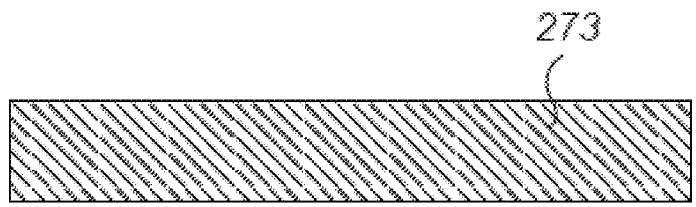
FIGS. 6a-d are cross-sectional view illustrating various embodiments of materials forming a tube having one or more layers, in accordance with embodiments of the invention.

The substrate may be formed of one or several sheets made of a single layer based on natural fibers, such as a cellulose-based layer, referred to as the first layer 273, as illustrated schematically in FIG. 6a.

Figure 6B:
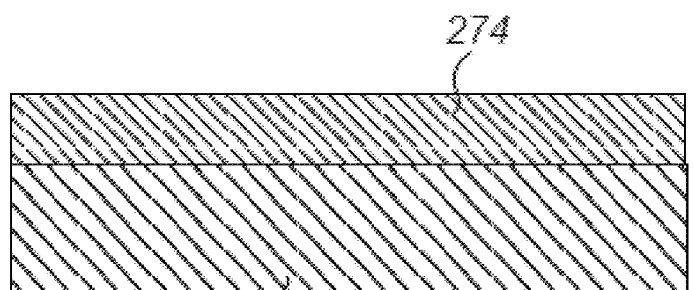

However, in other embodiments, the material may comprise one or more additional layers, such as in the form of a laminated second layer based on natural fibers, such as a cellulose-based material 274, as illustrated in FIG. 6b.

Figure 6C:
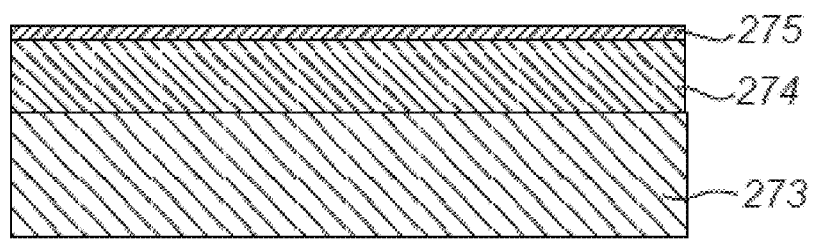
Figure 6D:
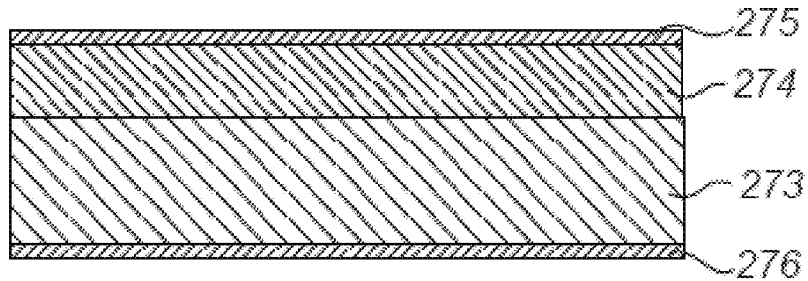

Additionally, or alternatively, the material may also comprise a non-cellulose-based layer, such as a thin polymeric film or coating. FIG. 6c illustrates an embodiment where such a thin film or coating 275 is arranged on top of the second cellulose-based material 274. FIG. 6d illustrates an embodiment where a thin coating or film 276 is also arranged on the opposite surface, on the lower side of the first cellulose-based material 273.

However, other combinations are also feasible, such as only a thin polymer film or coating arranged on the first cellulose-based layer, etc.

The substrate/first layer may include at least 30 wt % of natural fibers, and in particular cellulose fibers, and preferably at least 40 wt % of natural fibers, and in particular cellulose fibers, such as at least 50 wt %, at least 60 wt %, at least 70 wt %, at least 80 wt %, at least 90 wt %, or at least 95 wt %.

In one embodiment, the first layer is made primarily of natural cellulose fibers. In a preferred embodiment, the first layer is made of paper.

The material of the substrate is preferably chosen and arranged so that the substrate remains relatively intact and stable when exposed to water, urine, or other liquids. Preferably, the substrate is arranged to remain intact and stable when such liquids flows through its internal lumen during a determined use time period, e.g. at least for a period of time sufficient to drain urine from the bladder, such as for at least 5 minutes, and preferably at least 10 or 15 minutes. Preferably, the material is also arranged to resist, at least to a large extent, transfer of moisture from the interior surface of the substrate to the exterior surface during this determined use time period. Further, when the substrate has been provided with a hydrophilic coating or the like, the substrate should preferably also be able to withstand the activation process, such as being able to resist a liquid or other fluid during a time sufficient for wetting of the hydrophilic coating.

At the same time, the material of the substrate is preferably hydro disintegrating, and chosen and arranged so that the substrate to a large extent disintegrates when immersed in water, such as within a period of time sufficient to make the substrate flushable. For example, the substrate could be arranged to be sufficiently disintegrated when immersed in water for a few hours or less.

An additional layer may also be a cellulose-based layer, or based on other natural fibers, but preferably having at least to some extent different properties than the first layer, such as being more water resistant and/or having more rigidity. Any such additional layer preferably may also include at least 30 wt % of natural fibers, and in particular cellulose fibers, and preferably at least 40 wt % of natural fibers, and in particular cellulose fibers, such as at least 50 wt %, at least 60 wt %, at least 70 wt %, at least 80 wt %, at least 90 wt %, or at least 95 wt %.

In one embodiment, all layers of the material forming the substrate are cellulose-based layers.

However, an additional layer may also be made of a non-cellulose based material, such as a surface sizing agent, surface sizing starch or a thin coating of thermoplastic polymer.

In addition to the natural fibers, such as cellulose fibers, the material, and in particular the material of the first layer, may comprise additives, such as one or more of fillers, pigments, wet strength chemicals, retention chemicals, cross-linkers, softeners or plasticizers, adhesion primers, wetting agents, biocides, optical dyes, hydrophobizing chemicals such as alkyl ketene dimer (AKD), alkyl succinic anhydride (ASA), waxes, resins etc. Also starch and surface sizing agents may be used as additives.

The fillers may be any fillers known to be used in papermaking, such as mineral fillers like kaolin, china clay, titanium dioxide, gypsum, talc, chalk, ground marble, ground calcium carbonate and precipitated calcium carbonate.

One or more sizing additives, such as e.g., rosin, liquid paraffin wax, alkyl ketene dimer (AKD), alkyl succinic anhydride (ASA), etc., may be added to the fiber based material to provide a desired absorbency profile for the material.

In embodiments where AKD is used, the content of AKD is preferably in the range of 0.1-10 wt %, and preferably in the range 0-5-5%, and most preferably in the range 1-2 wt %.

In embodiments where poly(lactic acid) (PLA) is used, the content of PLA is preferably in the range of 0-50 wt %, and preferably in the range of 1-45 wt %, and more preferably in the range of 5-40 wt %, and even more preferably in the range of 10-35 wt %, and most preferably in the range of 20-30 wt %. Inclusion of PLA in the material makes the material more rigid.

The wet strength additives may e.g., be polymers, such as polyacrylic amide (PAM), or starch.

The natural fiber based material, and in particular cellulose based material, can be produced in a papermaking machine, such as any conventional type of machine known to the skilled person used for the production of paper, paperboard, or similar products. The dewatering may also include subjecting the web to heat, vacuum, ultrasound, pressure nips or the like. After dewatering and drying, the material may also be dried or smoothened by soft or hard nip, calendrers etc.

The cellulose fibers of the material may be wood cellulose fibers, both from hardwood and/or softwood fibers. However, the cellulose may also be from other sources, such as agricultural fibers such as wheat straw pulp, bamboo, bagasse, or other non-wood fiber sources. The material is preferably made from pulp including pulp from virgin fiber, e.g. mechanical, chemical and/or thermomechanical pulps. It can also be made from broke or recycled paper, i.e., recycled cellulose fibers.

The material may also include nanocellulose, such as a cellulose nanofiber material containing multiple elementary fibrils with both crystalline and amorphous regions. In this case, the nanocellulose may be included together with other cellulose in a layer, or arranged in a separate layer. The nanocellulose may be wood- or plant-based, and may be chosen from cellulose nanofibrils (CNF) or cellulose nanocrystals (CNC), preferably cellulose nanofibrils. This ensures that the raw materials for the cellulose product are obtained from an abundant, renewable and biodegradable source.

The material forming the substrate, regardless of whether it is a single layer material or a laminated material having two or more layers, preferably has a surface weight in the range of 90-130 g/m$^2$. If the cellulose has thicker and longer fibers, a thinner material, may be provided, having essentially the same properties.

In an embodiment with two layers, the outer layer may have a lower surface weight than the inner layer. Such an outer layer may provide a smoother, more homogeneous outer surface. For example, the outer layer may have a surface weight of 20-60 g/m$^2$, and preferably 25-50 g/m$^2$, and most preferably 30-50 g/m$^2$. The inner layer may have a surface weight of 60-120 g/m$^2$, and preferably 60-100 g/m$^2$, and most preferably 60-90 g/m$^2$.

The material of the substrate when formed into a tubular body is preferably arranged to be more water resistant, and have greater water repellency, on the internal and/or external surface, i.e., facing the internal lumen and the exterior, than in the middle of the wall.

To this end, a chemical surface sizing agent, surface treatment agent or the like may be added to the internal surface, and optionally also to the external surface.

Additionally, or alternatively, when a laminated material is used, the inner layer may be a cellulose based layer having less absorbency, and greater water resistance, than another layer, such as an outer layer and/or an intermediate layer.

In another embodiment, when a laminated material is used, a thin layer of a hydrophobic organic material or the like, such as poly(lactic acid) (PLA), may be arranged on the interior surface, as a coating. It is also possible to use a silicone-based layer, starch-based layer, clay-based layer, polyethylene (PE) layer, or other thermoplastic polymer layers, and the like. Instead of being laminated, such a layer may also be provided in the form of spray or dip coating, or the like. A layer including nano-cellulose may also be used towards the interior surface.

The sheet material forming the substrate is preferably biodegradable and non-toxic.

When the material of the substrate is to a large, or very large, extent made of cellulose, it can, depending on the composition, be made to disintegrate after a relatively short time when immersed in water. This makes it possible also to discard the substrate/medical device also in the toilet, to flush it down. In doing so, the substrate will after a while disintegrate similar to ordinary toilet paper.

Experimental Tests

In a first line of experiments it was evaluated whether is possible to coat paper based substrates with a hydrophilic coating, and whether such coatings would then be as good as when applied to conventionally used substrate materials.

For these tests, the following paper materials were used:
A) Lumiflex Light from Stora Enso with a grammage of 90 g/m$^2$.
B) SteriKraft from Billerud Korsnäs with a grammage of 60 g/m$^2$.
C) Drinking straws named "Förnyande" from IKEA, made of three layers of paper stripes arranged in a helical configuration, and having a diameter of 6 mm (corresponding to CH 18) and a wall thickness of 0.5 mm.

These substrates were formed into tubes and coated with a PVP coating, crosslinked by irradiation. These substrates are referred to as A1, B1 and C1.

Other substrates formed into tubes were coated with other types of hydrophilic, PVP-based coatings. These additional coatings were:

A PVP coating formed by a solvent based cross-linking system containing isocyanate and methylene chloride, generally of the type disclosed in EP 0093093, and also discussed in EP 2177238. The substrates coated in this way are referred to as A2 and B2.

A PVP coating which was crosslinked by UV radiation, in accordance with the method described in Example 1 in WO 2004/075944, with the exception of excluding NMP, due to environmental and safety reasons. It is presumed that this does not significantly impact the properties of the coating. The substrates coated in this way are referred to as A3 and B3.

A PVP coating which was crosslinked be E-beam radiation, in accordance with the disclosure of EP 2198897. The substrates coated in this way are referred to as A4 and B4.

For some of the coatings, a conventionally used polyolefin-based polymer substrate, known to have been used as substrates for hydrophilic urinary catheters, was used as a reference. These comparative reference substrates are referred to as CR2, CR3 and CR4.

In a first test, the coatings were manually evaluated. The result of these tests is presented below, in Table 1:

TABLE 1

Results from manual evaluation. Grades 1-5, where 5 is very good and 1 very poor.

| Material | Slipperiness | Roughness | Ability to withstand penetration during extensive rubbing |
|---|---|---|---|
| A1) | 5 | 4 | 5 |
| B1) | 5 | 4 | 5 |
| C1) | 5 | 2 | 5 |
| A2) | 5 | 4 | 4 |
| B2) | 5 | 4 | 4 |
| CR2) | 5 | 5 | 5 |
| A3) | 5 | 4 | 3 |
| B3) | 5 | 4 | 4 |
| CR3) | 5 | 5 | 2 |
| A4) | 5 | 5 | 4 |
| B4) | 5 | 5 | 4 |
| CR4) | 5 | 4.5 | 3 |

The roughness experienced in the C1) substrates is due to the seams in the tube being felt through the coating. To this end, this substrate was not used for the other coatings. Nonetheless, all the paper substrates were remarkably good, showing excellent low friction and slipperiness. The slipperiness also lasted throughout the entire evaluation.

It may also be noted that all the tested paper-based substrates had a slipperiness as good as for the comparative examples CR2, CR3 and CR4, and they were further essentially as good as the comparative examples in roughness and ability to withstand rubbing.

In a second test the water retention of the coatings was tested. The coating length was measured using a steel ruler and the diameter of the tubes was measured using a caliper. The coated paper tubes were dipped for 10 seconds in water, with the introduced tip, i.e., the tubular tip, being closed. The tubes were weighed prior to wetting/activation and then left to dry for one minute, and sub sequentially weighed, providing measurements after 1 minute and 6 minutes of drying in lab environment, respectively.

The results of these measurements are shown in the following Table 2:

TABLE 2

Results from water retention measurements

| Material | Water retention [mg/cm$^2$] 1 minute | Water retention [mg/cm$^2$] 6 minutes |
| --- | --- | --- |
| A1) | 11 | 9 |
| B1) | 11 | 9 |
| C1) | 11 | 9 |
| A2) | 12 | 9 |
| B2) | 9 | 7 |
| CR2) | 10 | 7 |
| A3) | 10 | 8 |
| B3) | 10 | 8 |
| CR3) | 14 | 12 |
| A4) | 9 | 8 |
| B4) | 10 | 9 |
| CR4) | 10 | 7 |

In a first test, the coatings were manually evaluated. The result of these tests is presented below, in Table 1:

Thus, it is found that all water retention in all the tested examples is very good, well exceeding the standards for conventional urinary catheters.

In a third test, the friction of the coatings was evaluated. The friction was measured with a Harland Friction Tester FTS 6000, with a load cell of 200 g. Prior to the measurement, the coatings were wetted for 10 seconds in water. The results of these measurements are presented below, in Table 3:

TABLE 3

Friction measurements

| Material | Coefficient of friction (μ) |
| --- | --- |
| A1) | 0.05 |
| B1) | 0.09 |
| A2) | 0.03 |
| B2) | 0.07 |
| CR2) | 0.04 |
| A3) | 0.1 |
| B3) | 0.1 |
| CR3) | 0.05 |
| A4) | 0.05 |
| B4) | 0.07 |
| CR4) | 0.07 |

In a first test, the coatings were manually evaluated. The result of these tests is presented below, in Table 1:

These measured friction values are extremely low. The coefficient of friction (COF) measured for the tested samples is much below the COF for most today available hydrophilic urinary catheters. The material C) was not evaluated, due to the seams in the straw disturbing the measurement.

In another line of experimental tests it was evaluated whether paper based tubular bodies were capable of enduring the exposure during urine and other liquids as would happen during a catheterization procedure. For these experiments, commercially available drinking straws made of paper were used, corresponding to the above-discussed material C).

In a first test, synthetic urine at a temperature of 37 deg. C. was arranged in a container and with the paper straw connected to an outlet of the reservoir. When the outlet of the reservoir was opened, the synthetic urine was allowed to flow through the paper straw for five minutes at an approximate rate of 3 ml/s.

In a second test, a paper straw was immersed in synthetic urine heated to 37 deg. C. in a beaker for five minutes in order to evaluate the effect of subjecting the paper straw to urine at human body temperature both on the inside and the outside.

After each test, a compression test was performed. Before the tests, the paper straw felt stiff and not bendable. After having been subjected to the urine the paper straw felt slightly softer. However, the straws where still intact, and even though somewhat more bendable and flexible, the straw did not collapse upon compression. When compressing with 50 and 100 grams of force, the straws did not collapse or were in any way affected by the compression.

These tests show that catheters based on paper have a capability of enduring the exposure to urine and other liquids to which it is subjected during an ordinary intermittent catheterization procedure.

In another line of experiments it was evaluated whether paper based tubular bodies would be capable of being inserted into a female and male urethra. For these experiments, commercially available drinking straws made of paper were used. The drinking straws used were a) the same straws called "Förnyande", sold by IKEA, and also b) corrugated, bendable straws sold by House of Marie. The latter straws correspond generally to a CH 18 catheter. These straws were provided with corrugations/creases, and where made of paper with layers of stripes arranged in a helix configuration. The straws a) were used both without coating, and also coated with the hydrophilic coating discussed in the foregoing. For other tests, a gel lubricant was used. As a reference, a commercially available LoFric® catheter (available from the applicant, Dentsply IH AB) of CH 18 was used.

For the test, female and male urethra models made by rubbery silicone from Nasco, Fort Atkinson, WI, were used. In addition, a male urethra model modeling the angle of the male urethra made in 3D printed hard plastic was used.

When testing in the artificial female urethra it was found that a dry, uncoated paper straw was difficult to insert, probably due to the high friction between the paper tube and the silicone urethra model. However, the paper straw retained its form and was not kinked or damaged after insertion and withdrawal from the model. For a paper straw lubricated with the gel lubricant, it was easier to insert and withdraw the straw from the urethra model, and the insertion and withdrawal properties were considered to be fully acceptable for use as a catheter. The paper straw provided with the hydrophilic coating was wetted/activated for 10 seconds and then inserted into the urethra model. This tube was by far the easiest to insert and withdraw from the urethra model. Directly after the insertion and withdrawal of the coated paper tube, an uncoated paper tube was inserted into the urethra model, but again this tube was difficult both to insert and remove, indicating a great difference between the coated and non-coated paper tubes. None of the paper tubes collapsed during insertion or withdrawal. In addition the reference catheter was used in the urethra model. The insertion of this catheter felt very similar to the coated paper catheter, with a smooth insertion and withdrawal.

From this it may be concluded that a paper based catheter can be used for insertion into a female urethra, and if coated with a hydrophilic coating, it has similar properties as conventionally used hydrophilic urinary catheters.

Similar tests were made for the male urethra models. An uncoated dry corrugated straw was successfully inserted and then removed from the 3D printed male urethra model. This shows that the flexibility added by creasing or corrugations is sufficient for paper catheter to be used in a male urethra. When used in the silicone male urethra model, it was found that the paper tube was difficult to insert when dry and uncoated. However, when lubricated with a gel lubricant the tube was successfully inserted into the model urethra and model bladder, and also removed with ease. The inserted tubes maintained their integrity, and had not collapsed or kinked throughout the catheterization process, and where not damaged.

From this it may be concluded that the coated, activated paper tubes are as easy and smooth as commercially available LoFric® catheters to insert and withdraw from the urethra models. The paper tubes lubricated with gel lubricant are not as good, but also functions adequately. Also, even uncoated and unlubricated tubes may be used, at least for females, even if somewhat less advantageous.

Concluding Remarks

Specific embodiments of the invention have now been described. However, several alternatives are possible, as would be apparent for someone skilled in the art. For example, different types of cellulose based material may be used, as well as other materials based on vegetable, bacterial and animal natural fibers, and may also be combined with layers which are non-cellulose based. Further, the substrate may be coated, or uncoated, and various types of hydrophilic coatings may be used.

Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

What is claimed is:

1. A medical device for insertion into a natural or artificial body opening, the medical device being a catheter and comprising a substrate forming a tubular body and having a wall enclosing an internal cavity, the wall extending between a proximal insertion end and a distal rearward end, wherein said wall comprises at least 30 wt % of natural fibers wherein the substrate is provided with a hydrophilic coating, the hydrophilic coating providing a low-friction surface character to the medical device when wetted by a wetting fluid, wherein the substrate is formed of at least two layers including an inner layer and an outer layer, wherein the inner layer has a Cobb value and the outer layer has a Cobb value that is higher than the inner layer, wherein the Cobb value of the inner layer is between 10-30 $g/m^2$ and the Cobb value of the outer layer is between 100-150 $g/m^2$.

2. The medical device of claim 1, wherein the natural fibers are at least one of vegetable, bacterial or animal natural fibers.

3. The medical device of claim 1, wherein said wall includes at least 40 wt % of natural fibers.

4. The medical device of claim 1, wherein said wall includes at least 50 wt % of natural fibers.

5. The medical device of claim 1, wherein said wall includes at least 70 wt % of natural fibers.

6. The medical device of claim 1, wherein said wall includes at least 80 wt % of natural fibers.

7. The medical device of claim 1, wherein said wall includes at least 90 wt % of natural fibers.

8. The medical device of claim 1, wherein said wall is made primarily of natural cellulose fibers.

9. The medical device of claim 1, wherein said wall is made primarily of paper.

10. The medical device of claim 1, wherein the wall of said substrate comprises a first layer and at least one additional layer, said at least one additional layer forming a laminated construction with said first layer.

11. The medical device of claim 1, wherein the tubular body comprises an inlet opening, an outlet opening and an internal lumen extending between said inlet opening and outlet opening.

12. The medical device of claim 1, wherein the tubular body is formed by at least one strip arranged winded in a helical shape or the tubular body results from two or more sheets that comprise the two or more layers with opposing sides of each of the two or more sheets arranged in contact with one another, or spaced in close vicinity to one another, and wherein the two or more sheets are displaced in relation to each other in a circumferential direction so that the opposing sides of each of the two or more sheets occur displaced from one another.

13. The medical device of claim 1, wherein the tubular body is formed by at least one sheet, each sheet arranged so that two opposite sides are arranged overlapping each other or adjacent to each other.

14. The medical device of claim 1, wherein the substrate is further provided with a plurality of creases, arranged around a circumference of the tubular body.

15. The medical device of claim 1, wherein the medical device is a urinary or rectal catheter.

16. The medical device of claim 1, wherein the hydrophilic coating is provided on an external side of the substrate.

17. The medical device of claim 1, wherein the hydrophilic coating comprises polyvinylpyrrolidone.

* * * * *